United States Patent
Boast et al.

(10) Patent No.: US 6,983,820 B2
(45) Date of Patent: Jan. 10, 2006

(54) NOISE AND VIBRATION SUPPRESSORS

(75) Inventors: David Boast, Chippenham (GB); Donald Milne Turner, Bath (GB)

(73) Assignee: Avon Polymer Products Limited, Wiltshire (GB)

(*) Notice: Subject to any disclaimer, the term of this patent is extended or adjusted under 35 U.S.C. 154(b) by 0 days.

(21) Appl. No.: 10/236,568

(22) Filed: Sep. 6, 2002

(65) Prior Publication Data

US 2003/0085071 A1    May 8, 2003

(30) Foreign Application Priority Data

Sep. 7, 2001  (GB)  ................................... 0121736
Oct. 18, 2001 (GB) ................................... 0125096

(51) Int. Cl.
  *F01N 1/02* (2006.01)
(52) U.S. Cl. .................... 181/249; 181/243; 181/232; 181/272
(58) Field of Classification Search ............... 181/249, 181/248, 255, 269, 272, 282, 404, 271, 292, 181/293, 286, 229, 213, 243, 227, 232, 207–209; 285/49
See application file for complete search history.

(56) References Cited

U.S. PATENT DOCUMENTS

| | | | |
|---|---|---|---|
| 2,047,443 A | | 7/1936 | Starkweather et al. |
| 2,251,880 A | | 8/1941 | Cary et al. |
| 2,343,152 A | * | 2/1944 | Marx ......................... 181/249 |
| 3,200,902 A | * | 8/1965 | Jones ......................... 181/243 |
| 3,212,603 A | | 10/1965 | Walker |
| 3,404,445 A | * | 10/1968 | Crouse .................... 29/890.08 |
| 3,996,016 A | | 12/1976 | Wagner |
| 4,091,892 A | | 5/1978 | Hehmann et al. |
| 4,106,587 A | | 8/1978 | Nash et al. |
| 4,113,050 A | * | 9/1978 | Smith ......................... 181/230 |
| 4,150,732 A | | 4/1979 | Hoch et al. |
| 4,213,414 A | * | 7/1980 | Sato et al. ................ 440/89 R |

(Continued)

FOREIGN PATENT DOCUMENTS

DE    976 032    1/1963

(Continued)

OTHER PUBLICATIONS

European Search Report, May 14, 2004.

*Primary Examiner*—Marlon T. Fletcher
*Assistant Examiner*—Renata McCloud
(74) *Attorney, Agent, or Firm*—Cook, Alex, McFarron, Manzo, Cummings & Mehler, Ltd.

(57) ABSTRACT

In order to form a noise suppressor in a hose of e.g. a motor vehicle, modular portions are connected in series to define suppression chambers with particular noise suppression characteristics. Those characteristics are due to the volume of each chamber, to the size of the apertures from the chambers to the central duct of the suppressor, and optionally due to spacers which are inserted into at least one aperture of the chambers to alter the effective open area of that aperture. Such spacers may also be used in which the noise suppressor is not modular. Where modular portions are used, it is preferable that each chamber is bounded by parts of two modular portions. A wall of one modular portion may then close the chamber in another modular portion, making the manufacture of the modular portions easier. Also disclosed is the use of a mass acting as a damper, which may be a noise suppressor as previously discussed, within a hose. The mass is connected to the hose by resilient means, e.g. electrometric material.

18 Claims, 11 Drawing Sheets

U.S. PATENT DOCUMENTS

| | | | |
|---|---|---|---|
| 4,244,442 A * | 1/1981 | Scarton et al. ............... | 181/230 |
| 4,327,817 A | 5/1982 | Scarton et al. | |
| 4,350,223 A | 9/1982 | Takei | |
| 4,352,408 A * | 10/1982 | Hardt et al. ................ | 181/249 |
| 4,356,885 A * | 11/1982 | Dello ......................... | 181/227 |
| 4,446,942 A * | 5/1984 | Hardt et al. ................ | 181/249 |
| 4,674,594 A * | 6/1987 | Jensen ........................ | 181/243 |
| 4,880,078 A * | 11/1989 | Inoue et al. ................ | 181/232 |
| 4,944,362 A | 7/1990 | Motsinger et al. | |
| 5,100,047 A * | 3/1992 | Nakagawa et al. ......... | 228/176 |
| 5,371,331 A * | 12/1994 | Wall ........................... | 181/227 |
| 5,578,277 A * | 11/1996 | White et al. ................ | 422/180 |
| 5,713,611 A * | 2/1998 | Kurimoto et al. ........ | 285/382.5 |
| 5,719,359 A | 2/1998 | Wolf et al. | |
| 5,839,405 A | 11/1998 | Falkowski et al. | |
| 5,894,115 A * | 4/1999 | Weiner ........................ | 181/272 |
| 5,901,988 A * | 5/1999 | Aihara et al. ............. | 285/288.1 |
| 5,926,954 A * | 7/1999 | Wolf et al. ............... | 29/890.08 |
| 5,979,598 A | 11/1999 | Wolf et al. | |
| 6,048,386 A * | 4/2000 | Gillingham et al. .......... | 96/384 |
| 6,109,304 A | 8/2000 | Wolf et al. | |
| 6,290,022 B1 | 9/2001 | Wolf et al. | |
| 6,374,718 B1 * | 4/2002 | Rescigno et al. ............ | 89/14.4 |
| 6,470,998 B1 * | 10/2002 | White ........................ | 181/243 |

FOREIGN PATENT DOCUMENTS

| | | |
|---|---|---|
| DE | 32 34 634 A1 | 9/1982 |
| DE | 44 16 361 A1 | 5/1994 |
| DE | 44 34 196 A1 | 9/1994 |
| DE | 195 04 223 A1 | 2/1995 |
| DE | 197 03 414 A1 | 1/1997 |
| DE | 297 01 296 U1 | 1/1997 |
| DE | 198 04 567 A1 | 2/1998 |
| DE | 199 43 246 A1 | 9/1999 |
| EP | 0 242 797 | 4/1987 |
| EP | 0 332 481 A1 | 9/1989 |
| EP | 0 682 335 B1 | 5/1995 |
| EP | 0 834 011 B1 | 4/1997 |
| EP | 0 911 567 A1 | 10/1998 |
| EP | 1 260 697 A2 | 11/2002 |
| GB | 990347 | 5/1963 |
| GB | 2 111 122 A | 9/1982 |
| GB | 2 234 015 B | 7/1987 |
| WO | WO 92/14922 | 2/1991 |
| WO | WO 97/18549 | 11/1996 |
| WO | WO 98/27321 | 12/1997 |

* cited by examiner

NOISE AND VIBRATION SUPPRESSORS

BACKGROUND OF THE INVENTION

1. Field of the Invention

The present invention relates to noise and vibration suppressors. In particular, the invention relates to such suppressors for use in motor vehicles.

2. Summary of the Prior Art

Motor vehicles have components which, in operation, produce noise and/or mechanical vibration. In order to prolong component life it is desirable to reduce vibration and hence reduce the vibrational stress experienced by parts of the vehicle, including parts of the engine. Furthermore, it is also desirable to reduce noise produced in the motor vehicle, usually for environmental and comfort reasons. In the context of this application, vibration or mechanical vibration is to be taken to mean unwanted oscillatory movement of a solid, for example a component of a motor vehicle. Noise is to be taken to mean unwanted sound waves in air or other fluid. Of course, vibration can lead to the radiation of noise from a vibrating part, and noise can lead to the vibration of a part on which the noise impinges.

In particular, this invention is concerned with noise and/or vibration associated with a turbocharger (turbo) of a motor vehicle although it is not intended to be limited thereto. U.S. Pat. No. 5,979,598 discloses an intake silencer for a motor vehicle. This publication is concerned with reduction of noise (rather than vibration) caused by the intake of combustion air into an internal combustion engine. The intake silencer has a fixed axial sequence of resonator chambers of different volumes arranged around an intake pipe. Each resonator chamber communicates with the intake pipe through apertures in the wall of the intake pipe. Each resonator chamber and its apertures together form a Helmholtz resonator which can absorb noise in the intake pipe in a particular frequency range.

U.S. Pat. No. 5,979,598 discloses that the active absorption frequency of a Helmholtz chamber depends on the volume of the chamber. In order to obtain broadband silencing, the silencer has chambers of different volumes. Thus, the silencer as a whole will absorb noise in the intake pipe over a fixed envelope of frequency ranges, the individual noise frequency absorption ranges of the chambers being determined, at least in part, by the chamber volumes.

WO98/27321 discloses a noise suppressor formed by a plurality of modules in series. The modules define suppression chambers with particular noise suppression characteristics, and the chambers are designed so that different modules have different characteristics. Each module is self-contained. Respective ends of the noise suppressor are then connected to ends of a hose.

SUMMARY OF THE INVENTION

The present inventors have investigated noise and vibration suppressors. Their investigations have given rise to four separate developments. Each development is introduced below, with a discussion of preferred aspects and features for each.

The present inventors have realised that it is possible to assemble a noise suppressor by connecting modular portions to define suppression chambers with particular noise suppression characteristics but for part of one module to close the chamber of another, unlike in WO 97/27321. This constitutes a first development of the present invention.

Preferably, in a first aspect of this first development, the present invention provides a noise suppressor having modular portions engaged in series to define a plurality of suppression chambers and an internal duct, each suppression chamber communicating with the internal duct via one or more apertures, each aperture having an area and each suppression chamber thereby having an associated total aperture area, wherein one combination of one of said chambers with its associated total aperture area has different noise suppression characteristics compared to a combination of another of said chambers with its associated total aperture area, and each suppression chamber is bounded by parts of two of said modular portions so that each chamber is separated from an adjacent chamber by a respective internal wall of the modular portions.

The noise suppressor may work by known noise suppression mechanisms, such as by Helmholtz resonance or by quarter wave cancellation. It is intended that the suppressor can operate via either of these mechanisms. In the case of quarter wave cancellation, the suppressor is tuned to particular frequencies by variation in the linear dimension (e.g. wall-to-wall distance) in the suppression chambers. In both mechanisms, the aperture area can affect the coupling efficiency of the chambers, and therefore the suppression efficiency. In the main, what is described here is described with reference to Helmholtz-type suppression, but it will be clear that much of what is described will be applicable to quarter wave cancellation also.

Preferably, each suppression chamber has substantially the same volume. Although this is not essential, an advantage here is that the modular portions (modules) can have similar shapes and therefore can be manufactured by the same process, with only minor subsequent modifications. This is described in more detail below.

It is intended that the chamber volume does not include any volume associated with the apertures, i.e. not included in the chamber volume is any volume which may be defined by an inner wall thickness in which the apertures are formed and the aperture area.

The suppression chambers may have substantially the same volume or linear dimension(s) in the sense that the respective chambers may be of the same volume or dimension(s), within normal manufacturing tolerances. If, for example, each chamber had the same total aperture area, then the noise suppression characteristics of each chamber would be substantially the same, due to the similarity in chamber volume or dimension(s), in the absence of differences in other relevant factors.

Preferably, each chamber extends around the duct, preferably all the way around the duct. Preferably, the chambers are arranged axially adjacent along the suppressor. Each chamber is preferably separated from an adjacent chamber by a respective internal wall of the modular portions. Furthermore, each chamber is preferably sealed with respect to the other chambers, except via communication through an aperture and the duct.

Preferably, the suppressor includes two, three, four, five, six, seven, eight, nine or ten or more suppression chambers. Preferably, the suppressor includes the same number of modular portions as it has suppression chambers.

Note that one of the chambers could have the same combination of volume and associated total aperture area as another, for example to reinforce damping at a particular noise frequency. Typically, each chamber has an optimum sound absorption frequency, preferably not less than 500 Hz, more preferably not less than 1500 Hz and preferably not higher than 8000 Hz, more preferably not higher than 5000 Hz. This is particularly suitable for suppression of turbo noise in an engine.

Preferably, the chamber optimum frequencies are separated by less than 300–400 Hz, typically less than 200 Hz, and more preferably by around 100 Hz. The separation of the frequencies may increase with increasing noise frequency.

Alternatively, e.g. for a normally aspirated engine, noise problems can occur at lower frequencies, between around 50 and 200 Hz, typically at around 110 Hz. In that case, each chamber preferably has an optimum sound absorption frequency in that range.

Preferred dimensions of the suppressor include a relatively small width compared to length. For example, the suppressor is preferably longer than it is wide, for example 50–100 mm wide, more preferably about 65 mm wide and about 110–200 mm long, more preferably about 150 mm long.

Preferably, each modular portion has at least one inner wall. In this case, the series of inner walls in the suppressor defines the internal duct. Typically, the apertures are spaces between the adjacent inner walls of adjacent modular portions. Preferably, the chambers are defined between inner and outer walls of one or more modular portions and between internal (side) walls of adjacent modular portions. The apertures may be formed adjacent one side wall. In that case, the apertures are formed at one end of each chamber. Alternatively, the apertures may be spaced apart from the side walls. In that case, the apertures are formed part of the way along each chamber rather than at either end.

Preferably, in each modular portion, the side wall is formed integrally with the inner wall and an outer wall. Preferably, the modular portions are engageable together in series so that the outer walls of adjacent modular portions sealingly engage with each other. This sealing engagement may or may not be gas-tight.

Preferably, the duct has a substantially smooth bore. This is so that air flow through the duct is substantially unhindered. At one end of the suppressor, the duct preferably extends to an inlet, and at the other end the duct preferably extends to an outlet. The inlet and/or outlet may be axially displaced from the series of suppression chambers. Preferably, the inlet and/or outlet are shaped for releasable attachment to part of a motor vehicle, such as a part associated with an engine, preferably between an air intake and a turbo inlet, or between a turbo outlet and an engine air intake.

Preferably, each modular portion is shaped so that it has a receiving end and an engagement end. At the receiving end, the outer surface of the outer wall is preferably formed with a step in it. At the engagement end, the inner surface of the outer wall is preferably formed with a step in it. The step at the receiving end of one modular portion is shaped and dimensioned to receive and engage the engagement end of another modular portion.

The length of the inner wall may vary from one modular portion to another. This means that the area of the aperture or apertures for a suppression chamber can vary with the length of the inner wall. This allows the suppression characteristics for a chamber to be selected, even in the case where the lengths of the outer walls of the modular portions, and the areas of overlap between them, are equal.

Additionally or alternatively, the inner walls may include apertures formed in them. These may be holes, slots or slits formed in the inner walls, for example by moulding, cutting or drilling. The total area of aperture in the inner wall may vary from one modular portion to another. This may be by varying the aperture sizes but would usually be by varying the number of apertures of a particular size in the inner wall.

Typically, the dimensions and shape of the outer wall and side wall of each modular portion are substantially the same as those of the other modular portions. When the modular portions are connected together, this gives a suppressor with suppression chambers of substantially the same volume. The suppression characteristics of each chamber may be selected by selecting the inner wall size and shape (i.e. by selecting the total aperture area for each chamber). The inventors have realised that the frequency of noise suppression depends not only on the volume of the suppression chamber, but also the total aperture area associated with that chamber.

Additionally or alternatively, the volume of the suppression chambers may vary from one modular portion to another. This variation may be used to select the suppression characteristics of the chamber. Thus, the suppression characteristics can be changed independently of the total aperture area. Preferably, the variations in volume of the suppression chambers in a connected series of modular portions is controlled in part by varying the axial length or the shape of the outer wall, in particular by varying the axial distance between the step in the outer surface at the engagement end and the end of the outer wall at the engagement end.

Preferably, the suppressor includes a spacer located at a gap between inner walls of adjacent modular portions. Preferably, the spacer is attachable to an end of the inner wall of one modular portion. Spacers of different axial lengths may be used. In this way, the area of the gap between inner walls of adjacent modular portions can be closed off to give a selected effective total aperture area.

Additionally or alternatively, the spacer may have projections (preferably axial projections) which serve to blank off part of the gap between adjacent inner walls. These projections may be in the form of castellations in the spacer. The effective aperture area can be controlled by varying the circumferential width and/or number of the axial projections, thereby filling in more or less of the gap to change the effective aperture area. In this way, one or more spacers can be used to tune the suppression chambers to particular noise suppression frequencies.

The spacer may be attached to opposing faces of adjacent inner walls, for example in the case where the side walls of the modular portions are not located at either extremity of the inner walls. This has the advantage that the inner walls can be secured to each other by ensuring that both inner walls make a tight fit with the spacer. This may reduce mechanical vibration of the free ends of the inner walls, such as may be caused by air flow or other vibration-causing sources. It may reduce distortion of the free ends of the inner walls, for example due to temperature and/or long term loads, causing creep, for example. In this case, the axial projections may extend across the axial length of the spacer, so that in effect the spacer preferably forms a spacing collar between the opposing faces of adjacent inner walls, with mounting surfaces adapted to attach to the adjacent inner walls, the spacer having radial holes, slots or slits formed in it, between the axial projections. Again, the effective area of the aperture would then be controlled by the total area of apertures formed in the spacer.

Preferably, the noise suppressor includes an outer tube, pipe or hose within which the connected modular portions are fitted or are locatable. This is advantageous in the case where the outer walls do not form a satisfactory gas-tight seal and/or if the noise suppressor requires further mechanical integrity. It may also serve to help make the noise suppressor act as part of a vibration absorber (see below).

The tube, pipe or hose preferably includes inlet and outlet parts, the inlet or outlet part shaped preferably for attachment (preferably gas-tight attachment) to a noise source, for example part of an engine such as a turbo inlet or outlet.

Preferably, the modular portions are moulded from plastics material or materials. The material may be flexible to allow the noise suppressor to bend or to be arranged to fit in a non-linear space. Alternatively, the noise suppressor may include flexible portions between modular portions to allow the suppressor to bend.

Preferably, the suppressor includes an end piece shaped for attachment to the receiving end of the first or last modular portion in a series in order to define the suppression chamber and/or aperture associated with that modular portion. Similarly, the first or last modular portion typically need not include an engagement part since there is no corresponding receiving part to attach to.

At least one, and preferably each, modular portion may include characteristic shapes at the receiving and/or engagement end. These receiving or engagement shapes are mateable with corresponding engagement or receiving shapes on an adjacent modular portion. This arrangement can be used to ensure that only a certain characteristic type of modular portion can be attached to another characteristic type of modular portion. This allows an assembly sequence to be ensured since the modular portions can be designed (by suitable design of the characteristic mateable shapes described above) to fit together only in the particular desired sequence. Suitable characteristic shapes may be a characteristic arrangement of corresponding lugs and slots on the receiving and/or engagement end.

Preferably, the modular portions are between 5 and 15 mm in axial length. Typically, the inner and outer walls are approximately cylindrical. Typically, the side walls are approximately radial.

Preferably, in a second aspect of this first development, the present invention provides a kit of parts for a noise suppressor including at least two and preferably more modular portions, each modular portion having an inner wall, a side wall and an outer wall, wherein the inner wall, side wall and outer wall partially enclose a space, each modular portion being connectable to another in order to define a suppression chamber by further enclosing the space with the side wall of said another modular portion, to give a suppression chamber with an aperture.

Preferably, the kit may be assembled into a noise suppressor according to the first aspect of this first development.

Preferably, the inner walls of the modular portions have different lengths. In that case, preferably the outer walls have the same lengths. Preferably, the side walls are substantially the same (including axial width) from one modular portion to another, but they may be different.

The inner walls may include apertures in them. In that case, the total aperture area of the inner wall of one modular portion is preferably different to that of the inner wall of another modular portion.

Additionally or alternatively, the outer walls may be of different length or shape so that, when one modular portion is attached to another, the distance between adjacent side walls is different.

The kit may further include two or more spacers, each shaped to attach to one or more inner wall. In that case the inner walls of the modular portions are preferably of the same size and shape. The spacers may have different axial lengths. Additionally or alternatively, the spacers may have axially extending portions with the gaps formed between the axially extending portions. The length of the axially extending portions may vary from one spacer to another. The total area of the gaps between the axially extending portions from one spacer to another may be different. The gaps may be enclosed. In that case, the spacer may have two mounting surfaces, to mount from two opposed faces of inner walls of adjacent modular portions.

Preferably, the kit includes any of the parts and/or preferred features described with respect to the first aspect of this first development of the invention.

Preferably, the kit includes modular portions which differ fro each other in step-wise variation of one or more of:
(i) length of inner wall,
(ii) length of outer wall,
(iii) width of side wall, and
(iv) total aperture area in inner wall.

Additionally or alternatively the kit includes spacers which differ from each other in step-wise variation of one or more of:
(i) axial length,
(ii) axial length of projections,
(iii) circumferential width of axial projections, and
(iv) total area of aperture(s) formed in the spacer.

Preferably, the kit includes modular portions and/or spacers as described above which are colour coded according to their dimensions. The modular portions may have the characteristic shapes described above with respect to the first aspect in order to ensure that only a particular sequence or sequences of modular portions is assembled.

Preferably, in a third aspect of the first development, the present invention provides a method of assembling a noise suppressor from a kit of parts as defined with respect to the second aspect of the first development, including the steps of:
(1) selecting two or more modular portions, having differences with respect to at least one of:
(i) length of inner wall,
(ii) length of outer wall,
(iii) width of side wall, and
(iv) total aperture area in inner wall, or
(2) selecting two or more modular portions and selecting two or more spacers, the spacers having differences with respect to at least one of:
(i) axial length,
(ii) axial length of projections,
(iii) circumferential width of axial projections, and
(iv) total area of aperture(s) formed in the spacer, and
(3) attaching the two or more modular portions and optionally attaching the two or more spacers between adjacent inner walls, to form a noise suppressor with suppression chambers with different noise suppression characteristics.

A preferred feature of the first development of the invention was the location of the modular noise suppressor within a hose. The inventors have realised that the use of a modular noise suppressor within a hose is advantageous even when the chambers are wholly contained within respective modular portions. This constitutes a second, independent development of the present invention, in which it is not necessary that each suppression chamber is bounded by parts of two of said modular portions.

Preferably, in this second development, the present invention provides a hose arrangement including a hose with a noise suppressor located within the hose, the noise suppressor having modular portions engaged in series to define a plurality of suppression chambers arranged in series, and an internal duct, each suppression chamber communicating with the internal duct via one or more apertures, each aperture having an area and each suppression chamber thereby having an associated total aperture area, wherein one combination of one of said chambers with its associated total aperture area has different noise suppression characteristics from a combination of another of said chambers with its associated total aperture area.

The disposition of a noise suppressor within a hose reduces the mechanical demands on the noise suppressor. Firstly, the noise suppressor need not be gas-tight since the hose can define a gas-tight envelope around the noise suppressor. In use, it can be a part of the hose, rather than a part of the noise suppressor, which is attached to a noise source. Typically, this noise source is part of an engine, such as an inlet or outlet of a turbo. Such connection is usually achieved using a clip or clamp, such as a jubilee-type clip. In order to maintain connection during operation, the clamping pressures used are usually high. For this reason, no noise suppressors were usually of rugged construction, typically made of metal. In this second development, the noise suppressor need not be so rugged since the clamping pressures can be withstood instead by the hose. For this reason, it is practicable to construct the noise suppressor from plastics materials which would not be able to withstand the clamping pressures as described above. The advantages of these materials include ease of forming (e.g. by injection moulding) which require little or no machining after forming to arrive at a desired shape.

It is to be understood that any of the preferred features described above with respect to the first development are applicable also to this second development.

Preferably, the noise suppressor is located within the hose spaced away from one end of the hose thereby to permit connection of said one end of the hose to a noise source, such as a turbo inlet/outlet.

In a preferred embodiment, the hose arrangement includes two spaced-apart suppressors within the hose. In this case, the hose may be bent in the space between the noise suppressors, typically in order for the hose arrangement to fit in a non linear space, i.e. between non-coaxial attachment locations in an engine.

In the first development described above, the preferred feature of tuning a modular noise suppressor using spacers or insert parts of particular shapes was described. The inventors have found that the use of insert parts to tune a noise suppressor is advantageous even when the noise suppressor is not modular. Accordingly, this is a third, independent development of the invention, in which it is not necessary that the noise suppressor is modular.

Preferably, in a first aspect of this third development, the present invention provides a noise suppressor having a plurality of suppression chambers arranged in series, and an internal duct, each chamber having a inlet to the internal duct, the suppressor having at least one insert part removably mountable in the inlet of at least one chamber partially to obstruct said inlet, the insert part being arranged to affect the noise suppression characteristics of said at least one chamber.

In this third development, it is not necessary that the noise suppressor is an assembly of modular portions, although this may be desirable as outlined with respect to the first development. Particularly in a non-modular noise suppressor, it can be difficult to control accurately the total inlet area associated with each suppression chamber. This is particularly the case where it is intended to give each suppression chamber a different effective total inlet area.

The third development of the invention can be particularly useful in the case where a suppressor is made where each chamber has the same total aperture inlet area. If, for example, each suppression chamber had substantially the same volume, then each suppression chamber would have substantially the same noise suppression characteristics, in the absence of insert parts. Using insert parts, each chamber can be tuned to a particular set of noise suppression characteristics by changing the effective inlet area by obstructing the inlet.

Preferably, in the case where the noise suppressor is modular, the noise suppressor is as described with respect to the first aspect of the first development.

The inlet of each suppression chamber may be formed by a plurality of apertures. More preferably, the insert part is shaped to obstruct entirely one or more of said apertures. The insert part may be engageable with the one or more apertures which it obstructs in order to locate the insert with respect to the internal duct.

Alternatively, the inlet of each suppression chamber may be an annular slot extending circumferentially around the internal duct. In that case, the insert may be ring- or collar-shaped and may include blanking projections which project axially from the remainder of the insert. These projections may be in the form of castellations. Viewed differently, the insert may have aperture spaces in it, these spaces being separated from each other by the blanking projections. Additionally or alternatively, the insert part may be ring- or collar-shaped and may have enclosed holes or slots formed in it.

The inlets associated with each chamber in the noise suppressor have a depth, in the case where the inlets are formed by apertures, this is usually determined by the thickness of an inner wall in which the apertures are formed. In general, the depth of the aperture affects the coupling efficiency of the suppression chamber, and therefore the noise suppression efficiency of the suppression chamber. The slots or holes in the insert part may have a different depth to the apertures, thereby to affect the coupling efficiency of the suppression chamber as well as affecting the total aperture area of the suppression chamber. Of course, different insert parts may have different hole or slot depths in addition to or as an alternative to having different hole or slot total areas.

This first aspect of the third development of the invention may include any of the preferred features described with respect to the first or second developments of the invention.

In a second aspect of this third development, the present invention provides a kit of parts including a noise suppressor module having a plurality of suppression chambers arranged in series, and an internal duct, each chamber having an inlet to the internal duct, the kit further including a plurality of insert parts, wherein each insert part is removably locatable in the noise suppressor module and each insert part is shaped in order, on location in the noise suppressor module, partially to obstruct to different extents the inlet of at least one of the suppression chambers.

Preferably, the noise suppressor module and/or the insert include any of the features defined with respect to the first aspect.

In the first three developments above, it is possible, though undesirable, for the chambers to be partially bounded by the hose itself. However, in the fourth development, the noise suppressor has an outer wall within the hose which bounds the chambers. Thus, the hose is spaced from the chambers by at least that outer wall. The result is a hose arrangement formed e.g. by inserting the noise suppressor into an existing hose.

The noise suppressor itself may be formed by modular portions, as in the first and second development, and/or may have insert parts to tune the suppressor as in the third development. Other features of the first three developments may also be incorporated into this fourth development.

The above fifth developments of the present invention deal with suppression of noise. A further problem which is often associated with noise sources, particularly with motor vehicle engines and more particularly with turbos, is that of mechanical vibration. A turbo is largely composed of metal and has little inherent mechanical damping. In operation, a turbo vibrates with a high modal density, for example in the frequency range 1500 to 3500 Hz.

The inventors have further realised that it is possible to use an adapted hose arrangement to perform two functions. The first is the ducting function usually associated with hoses, that is the transfer of a fluid within a hose. The second is that of a vibration absorber. In general sense, the absorption may be provided by a movement of an inner mass with respect to a hose wall, and/or the inner bore of a turbo inlet or outlet, the relative movement bring driven by, and thereby capable of absorbing, mechanical vibration. This constitutes a fifth, independent development of the present invention.

Preferably, in this fifth development, the present invention provides a hose arrangement including a hose wall and an inner mass arranged in the space enclosed by the hose wall and/or the inner bore of a turbo inlet or outlet, the inner mass being separated from the interior of the hose wall or bore by resilient means so that the inner mass has a rest position towards which the resilient means urges the inner mass, the hose wall or bore and the inner mass being moveable relative to each other against the urging of the resilient means by a vibrational force, thereby to dampen the vibration. The inner mass may be wholly within the hose, partially within the hose and partially within the inner bore of the turbo inlet or outlet, or wholly within that hose.

Preferably, the resilient means is made from elastomeric material, preferably being one or more rings of elastomeric material such as O-rings. Alternatively the spring means is a liner on the hose wall of the hose.

The inner mass is typically of generally cylindrical form in order to fit within the space enclosed by the hose wall or turbo inlet/outlet bore. It may itself be flexible and/or include portions which can, to a limited extend, move independently of each other. The spring means are fitted around the inner mass, preferably being axially spaced from each other.

It is preferable that the inner mass is all or part of a noise suppressor according to the first aspects of the first, or third developments described above. In that case, the device is capable of damping noise in the duct of the noise suppressor and also capable of damping mechanical vibration transmitted to the hose arrangement. It is envisaged that the mechanical vibration will be transmitted to the device by connection to a source of mechanical vibration, for example part of a motor engine such as a turbo.

The dimensions, number, mass and/or elasticity of the spring means are selected according to the frequencies of the mechanical vibrations to be damped. Generally, in the case where the inner mass is a noise suppressor, the inner mass is not necessarily selected with the frequencies of the mechanical vibrations in mind, although that could be advantageous. Instead, the characteristics of the spring means are selected so that the arrangement is tuned to dampen particular ranges of frequencies of mechanical vibration.

Preferably, the present invention provides a motor vehicle or engine including a noise suppressor according to the first aspects of the first or third developments of the invention, and/or including a hose arrangement according to the second, fourth or fifth developments of the invention.

More particularly, the present invention may provide a turbo arrangement including a noise suppressor according to the first aspects of the first or third developments of the invention, and/or including a hose arrangement according to the second, fourth or fifth developments of the invention, wherein the noise suppressor or hose arrangement is preferably attached to the outlet at the compressor site of the turbo.

BRIEF DESCRIPTION OF THE DRAWINGS

Preferred embodiments of the invention are described below, by way of example only, with respect to the accompanying drawings, in which.

DETAILED DESCRIPTION

Figure 1:
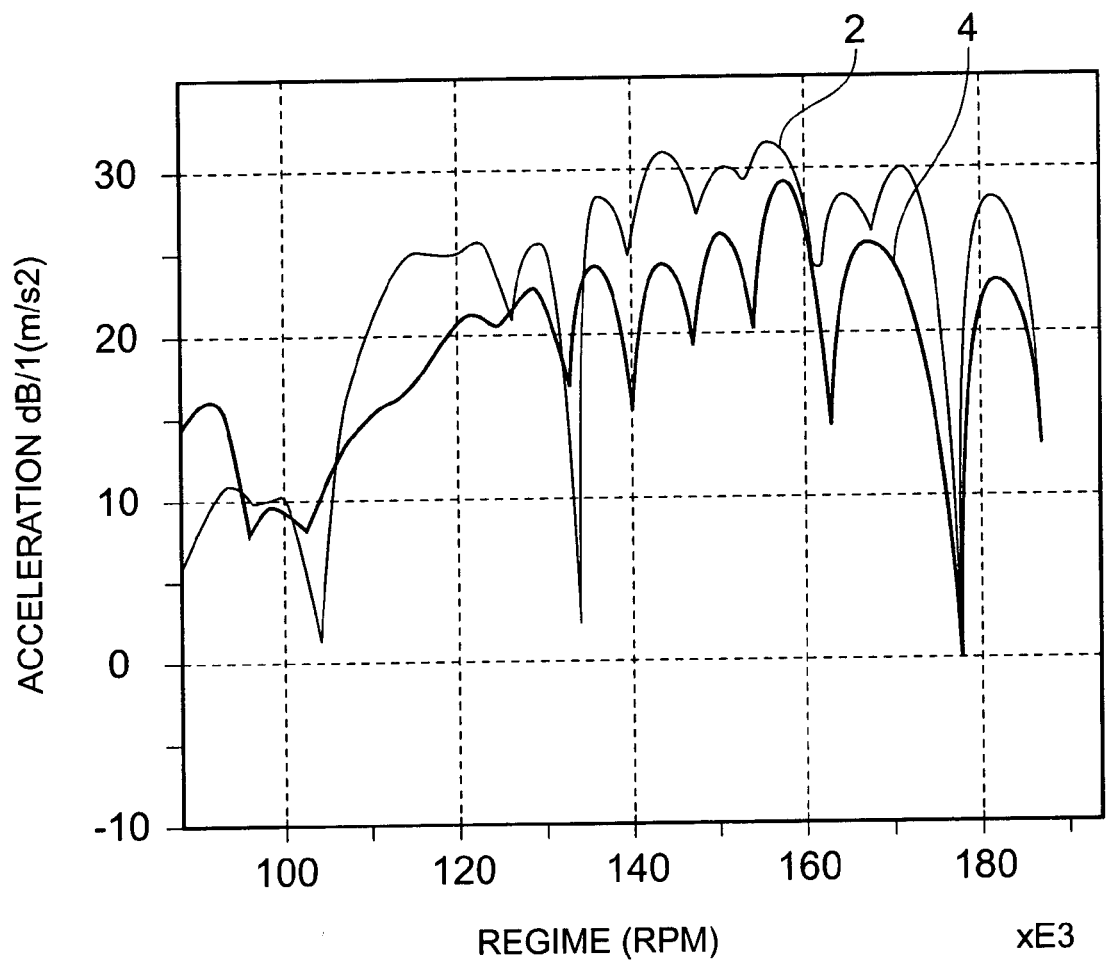
FIG. 1 shows a typical turbo noise profile.

FIG. 1 shows two vibration profiles resulting from turbo noise. The ordinate measures vibration amplitude and the abscissa indicates the frequency regime. It can be seem from FIG. 1 that, at certain frequencies, the vibration amplitudes are higher than at others. Line 2 in FIG. 1 shows the results measured from a vibration source with high vibration and high noise. Line 4 in FIG. 1 shows a measurement from a source with high vibration and low noise. It is clear from FIG. 1 that the vibration levels resulting from the high noise are higher are certain frequencies than at others. Therefore, if it is desired to reduce the levels of vibration, then it would be particularly helpful to reduce certain frequencies of vibration more than others.

Figure 2:
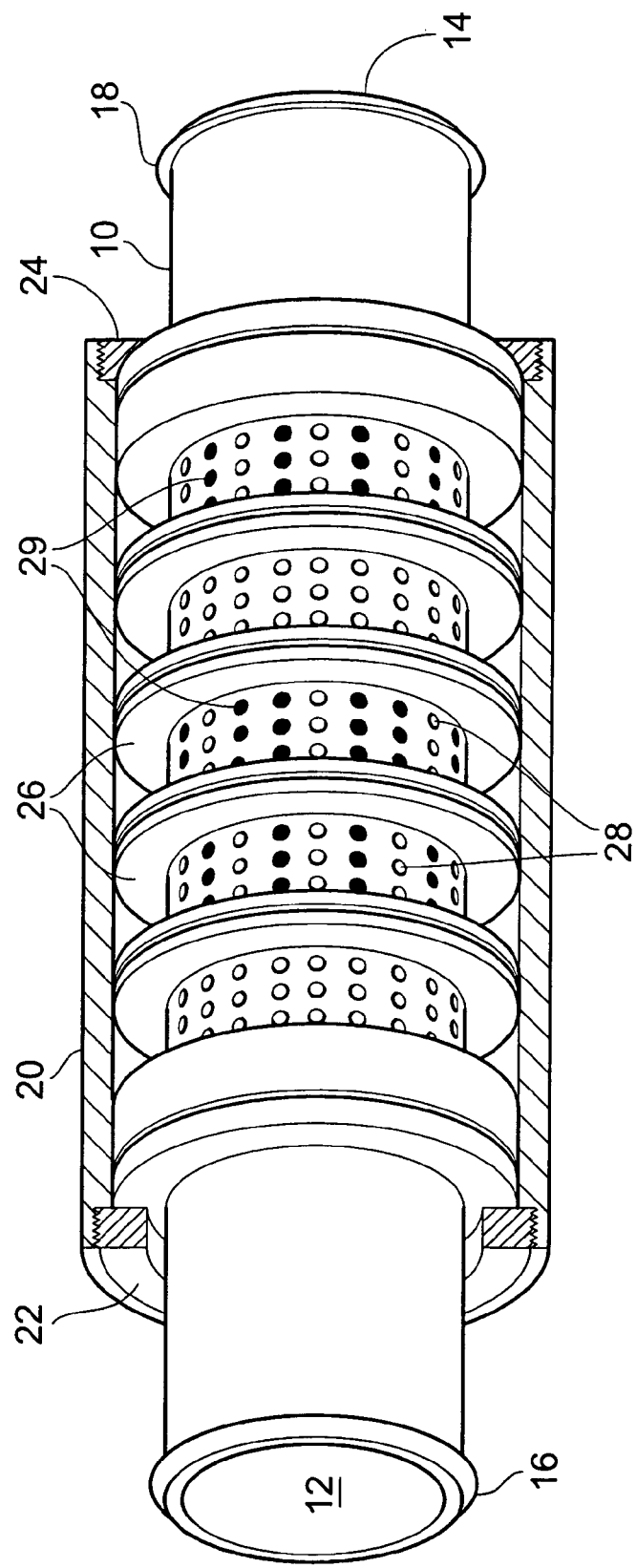
FIG. 2 shows a schematic perspective partial sectional view of a noise suppressor according to an embodiment of the invention.
Figure 3:
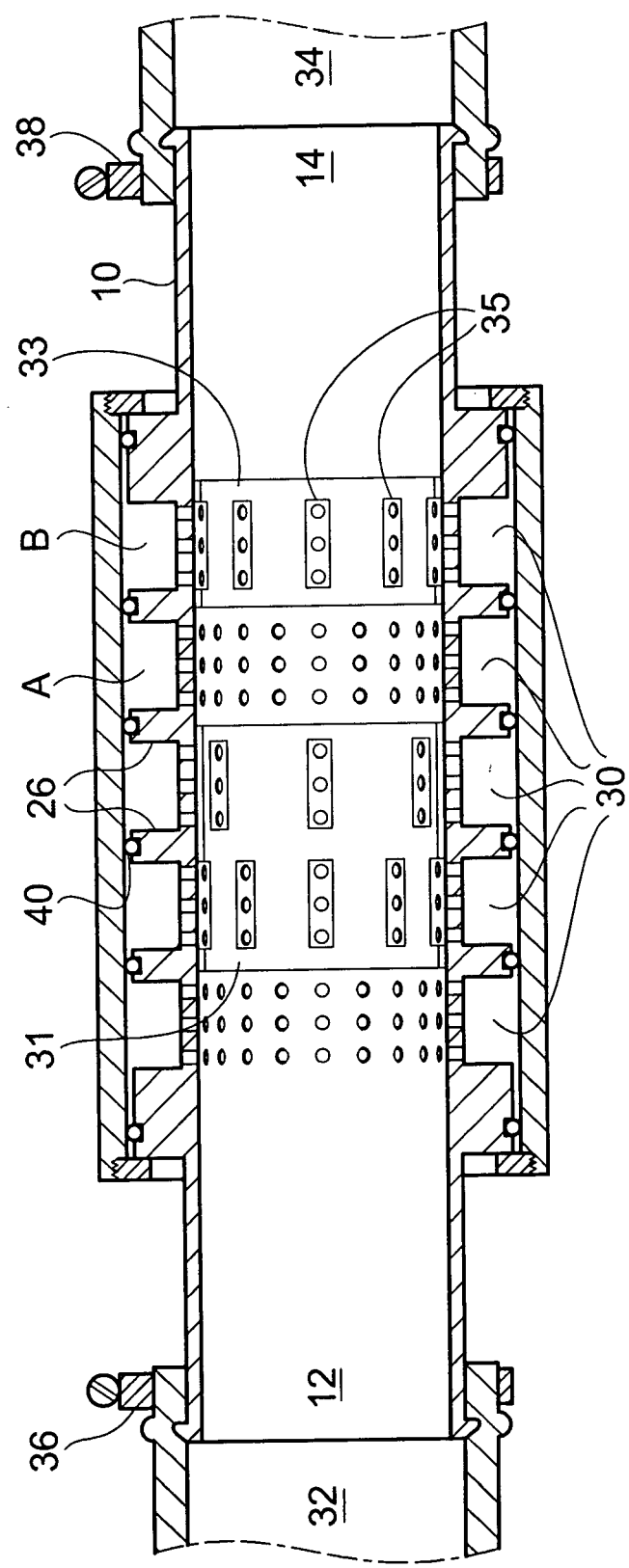
FIG. 3 shows a schematic sectional view of the suppressor shown in FIG. 2, attached at its inlet and outlet.

FIG. 2 shows a partial sectional view of a noise suppressor according to an embodiment of the invention. Not shown in FIGS. 2 and 3 are inserts used to blank off some of apertures 28. The suppressor includes a central pipe 10 having an inlet 12 and an outlet 14. The pipe 10 is shaped at the inlet 12 and outlet 14 for frictional attachment to parts of an engine by sloping step regions 16, 18 respectively. The suppressor includes an outer pipe 20. The inner pipe 10 and outer pipe 20 are sealed and held with respect to each other by rings 22 and 24.

Between the outer pipe 20 and inner pipe 10 is disposed a series of annular chambers, separated from each other by side walls 26. Apertures 28 are formed in the inner pipe wall. The chambers communicate with the duct defined by the inner pipe through apertures 28.

In this embodiment, the sizes of apertures 28 are substantially identical. They are circular holes formed by drilling or moulding. Before insertion of inserts (not shown) into the suppressor, each chamber has the same number of apertures 28 associated with it. Those apertures 29 which are obstructed by the inserts are shown filled in as black in FIG. 2. The structure of the inserts is shown in FIG. 3.

As is shown more clearly in FIG. 3, the chambers 30 have the same volume. In FIG. 3, the inlet 12 is attached to a duct 32 by a clip 36. Similarly, outlet 14 is attached to a duct 34 by a clip 38. Clips 36 and 38 may be jubilee clips.

Chambers 30 are sealed from adjacent chambers by sealing rings 40. These are typically O-rings, made of elastomeric material. Of course, chambers 30 are not entirely sealed, since they communicate with the interior of pipe 10 via apertures 28. As can clearly be seen in FIG. 3, the bore of pipe 10 is smooth, apart from apertures 28. This helps to give a uniform gas flow through the pipe 10.

In FIG. 3, chambers A and B have the same volume. As mentioned above, each chamber A and B has the same number of apertures 28 leading into that chamber, before inclusion of the inserts 31,33. Inserts 31,33 are used to blank off some of the apertures 29. Consequently, chambers A and B have different numbers of open apertures 28 leading into them. Since each aperture 28 has similar dimensions, the total aperture area for chamber A is larger than the total aperture area for chamber B. As has been discovered by the inventors, a consequence of this is that chamber A and chamber B absorb noise over different ranges of characteristic frequencies. These ranges may overlap, but the peak absorption for each chamber will be at a different frequency. This is despite that fact that chambers A and B have the same volume. In this regard, it should be noted that the volume of chambers A and B is considered not to include the volume of the apertures 28.

Insert 33 is a cylindrical collar, typically formed of plastics material, fitting within duct 14 by a frictional fit. Insert 33 has slots 35 formed in it, these being shaped and positioned in order to leave open apertures 28 when the insert is located in the noise suppressor. The remaining apertures 29 associated with chamber B are obstructed. As illustrated by insert 31, the insert can extend to more than one chamber.

The exemplary noise suppressor illustrated in FIGS. 2 and 3 would have three characteristic absorption frequency ranges. Typically, these ranges would overlap. The reason there are only three ranges, rather than five (corresponding to the number of chambers) is that there are only three different total aperture areas per chamber chosen in this schematic illustration. Of course, the noise suppressor shown could use more chambers and/or different total aperture areas in order to change the characteristic noise frequency absorption.

It has been found that increasing the number of chambers can increase the noise absorption efficiency. It is thought that this is because this reduces the reflection of sound waves travelling along the duct back towards the noise source.

FIGS. 2 and 3 show clearly that side walls 26 are formed integrally with the inner pipe 10, and that the outer wall 20 and inner pipe 10 are common to each suppression chamber 30.

An alternative embodiment and modifications thereof are shown in FIGS. 4 to 9.

Figure 4:
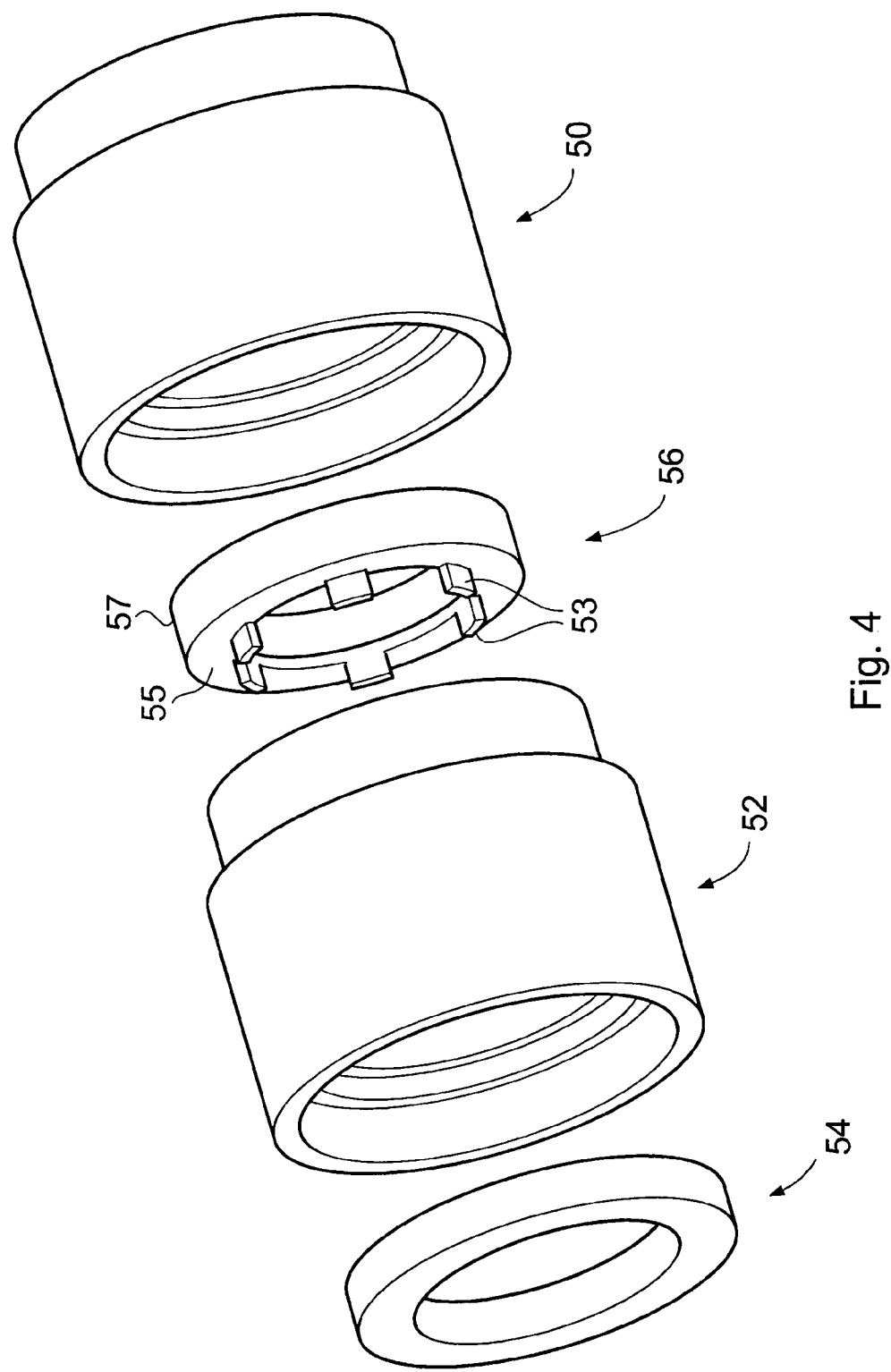
FIG. 4 shows a schematic partial exploded view of a noise suppressor according to another embodiment of the invention.

Looking first at FIG. 4, this shows an exploded perspective view of part of a noise suppressor made from modular elements. Here, the suppressor is shown having four parts. These are modular chamber elements 50, 52, end ring element 54 and ring spacer element 56. Modular elements 50, 52 have generally cylindrical features. These features are perhaps shown more clearly in FIGS. 5*a*, 5*b* and 6.

Figure 5A:
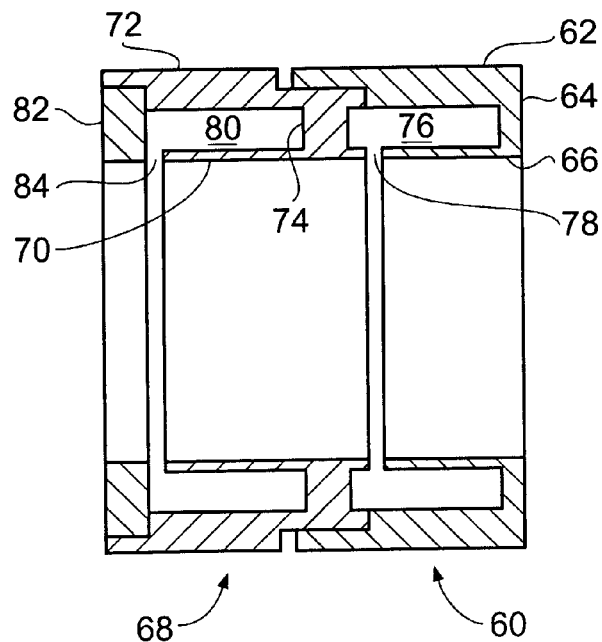
FIGS. 5a and 5b show schematic sectional views of another two embodiments of the invention.

In FIG. 5*a*, modular element 60 has an outer wall 62, a side wall 64 and an inner wall 66. Inner wall 66 is generally cylindrical, and of smaller diameter than outer wall 62, which is also generally cylindrical and at least partially annularly surrounds the inner wall. Outer wall 62 and inner wall 66 are attached via side wall 64. Modular element 60 is releasably connected to adjacent modular element 68. In FIG. 5*a*, element 60 and element 68 are of slightly different shape, but this is not essential. Element 68 has inner wall 70 and outer wall 72 attached via side wall 74. Element 60 has a step formed in the inner surface of outer wall 62. Element 68 has a corresponding step formed in the outer surface of outer wall 72. These steps are shaped so that outer wall 62 is releasable connectable to outer wall 72, in this case by a sliding frictional fit. Element 68 has its side wall 74 formed not at either extremity of inner wall 70 or outer wall 72 but between these extremities. This leaves a small overhang of inner wall 70 and outer wall 72 past side wall 74.

Attachment of element 60 to element 68 leaves a chamber 76 which is bounded by outer walls 62, 72, side walls 64, 74 and inner walls 66, 70. As can clearly be seen in FIG. 5*a*, inner walls 66 and 70 do not meet. Therefore chamber 76 communicates with the space (duct) enclosed by inner walls 66, 70 via aperture 78.

Similarly, chamber 80 is enclosed by outer wall 72, inner wall 70, side wall 74 and ring portion 82, leaving aperture 84 between ring portion 82 and inner wall 70. Therefore chamber 80 also communicates with the space (duct) enclosed by inner walls 66, 70, but through a different aperture (84).

The connection of modular elements 60, 68 gives a duct and noise suppression chambers 76, 80 communicating with the duct via apertures 78, 84. Tuning of the noise suppression frequencies of the chambers may be achieved by altering the total area of the apertures and/or by altering the volume of the chambers. Both of these can be achieved by sliding element 60 slightly with respect to element 68 to enlarge chamber 76 and aperture 78.

Alternatively, if elements 60 and 68 have a fixed relationship, then the volume of the chambers and area of the apertures need to be fixed at the time of manufacture.

Figure 5B:
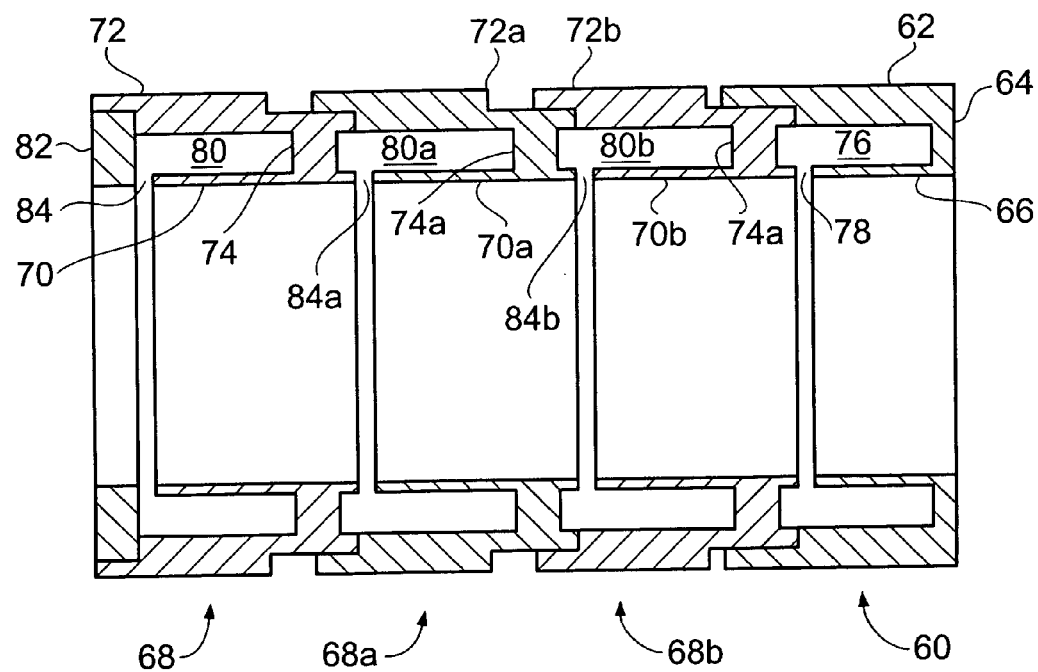

FIG. 5*b* shows a schematic view through a modification of FIG. 5*a*, in which there are four modular elements. The outer modular elements 60, 68 are the same as in FIG. 5*a* and corresponding parts are indicated by the same reference numerals. In addition, two modular elements 68*a* and 68*b* are present between modular elements 60 and 68 and each are of the same general configuration as modular element 68. Therefore, corresponding parts are indicated by similar reference numerals, with the letters a and b added as appropriate.

Thus element 68*a* has a step formed in the outer surface of outer wall 72*a*, which is shaped so that it is releasably connected to outer wall 72, e.g. by a sliding frictional fit as in the embodiment of FIG. 5a. Similarly, elements 68b has a step formed in the outer surface of outer wall 72b so that it is releasably connected to outer wall 72a. The outer wall 62 of element 60 is then releasably connectable to outer wall 72b.

Thus, a series of chambers 76, 80b, 80a and 80 are formed along the noise suppressor. Each chamber is bounded by respective walls and communicates with the space (duct) within the noise suppressor by respective apertures 78, 84b, 84a and 84.

As in the embodiment of FIG. 5a, tuning of the noise suppression frequencies of the chambers 76, 80b, 80a and 80 may be achieved by altering the total area of the apertures and/or by altering the volume of the chambers. Both of these can be achieved by sliding adjacent modular elements to enlarge or contract the corresponding chambers and apertures. Thus, if element 68a is slid slightly to the right in FIG. 5b relative to element 68, the chamber 80a and the aperture 84a are both slightly enlarged, to give a slightly different noise suppression frequency to that chamber/aperture.

As a further development of this, different modules can be made to have slightly different sizes, to vary the noise suppression frequencies. Thus, in FIG. 5b, although the element 60, 68b, 68a and 68 are slid together as close as possible, as determined by the interlocking of their outer walls 62, 72b, 72a and 72, the inner walls 66, 70b, 70a and 70 may be of slightly different lengths, to provide different sized apertures 78, 84b, 84a and 84.

It will also be appreciated that the noise suppressor of FIG. 5b may be modified by the addition of further modular elements to form a noise suppressor of any length, with the different chambers tuned to different noise suppression frequencies to give the best noise suppression effect for a given size.

Figure 6:
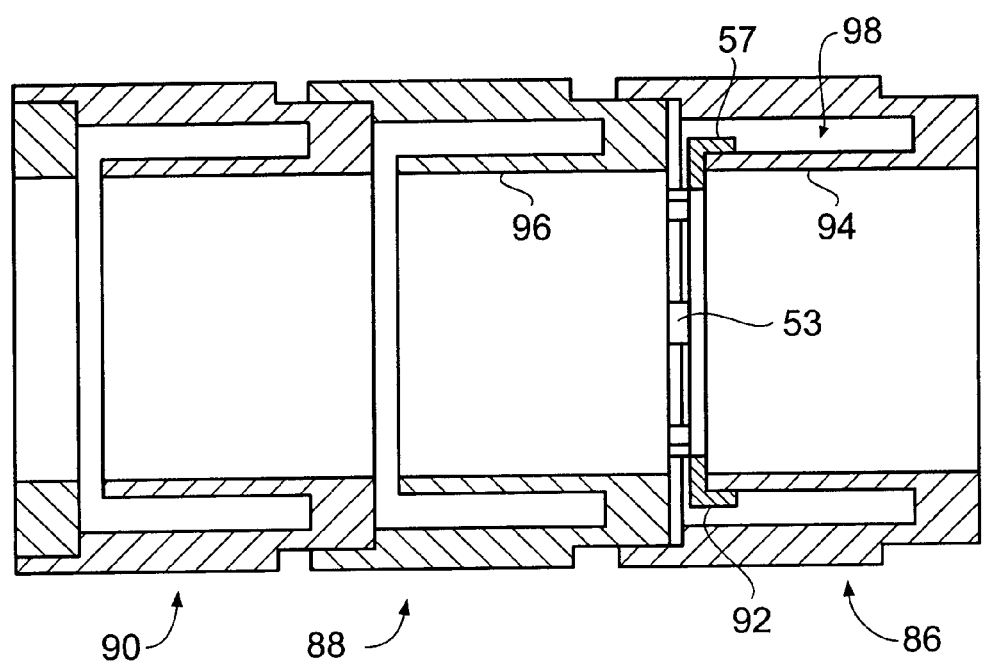
FIG. 6 shows a schematic sectional view of an assembled noise suppressor similar to that shown in FIG. 4.

FIG. 6 shows a schematic sectional view of an assembled version of the exploded arrangement of FIG. 4. Here, in contrast to FIGS. 5a and 5b, the modular elements 86, 88 and 90 have identical shapes. It would of course be possible to produce a noise suppressor with suppression chambers tuned to different frequencies by connecting modular portions which differed only in that the inner walls where of different lengths. This would give rise to different aperture areas for different suppression chambers.

FIG. 6 shows one way to obtain a noise suppressor with suppression chambers tuned to different frequencies using identical modular elements 86, 88, 90. This involves using a spacing ring 92, described in more detail below.

Spacing ring 92 is also shown as spacing ring 56 in FIG. 4. The illustration shown in FIG. 4 will be used here. Spacing ring 56 has a cylindrical wall 57 and a radial wall 55 extending inwards from one end of cylindrical wall 57. At the inner periphery of radial wall 55 are axially projecting blanking portions 53. As can be seen in FIG. 4 these have some cylindrical curvature.

Turning back now to FIG. 6, spacing ring 92 is shown located in position. Cylindrical wall 57 is shaped to fit over inner wall 94 of modular portion 86. In location, axial blanking projection portions 53 serve to fill in some of the aperture formed between inner walls 94 and 96 of adjacent modular portions 86, 88. Therefore the total aperture area in communication with chamber 98 depends upon the circumferential width and axial length of projections 53. Thus, a particular chamber can be tuned to a particular frequency by selecting a spacing ring 56/92 which will fill-in a particular proportion of the aperture. It is envisaged that a kit of parts would include identical modular elements 86, 88, 90 (and more if required) and spacing rings, each with differently sized projecting portions 53. It is further envisaged that spacing rings which differ from each other will be colour-coded in order to ease and speed up assembly of a noise suppressor. Similarly, modular elements which differ from each other in, for example, inner wall length could also be colour-coded.

Figure 7:
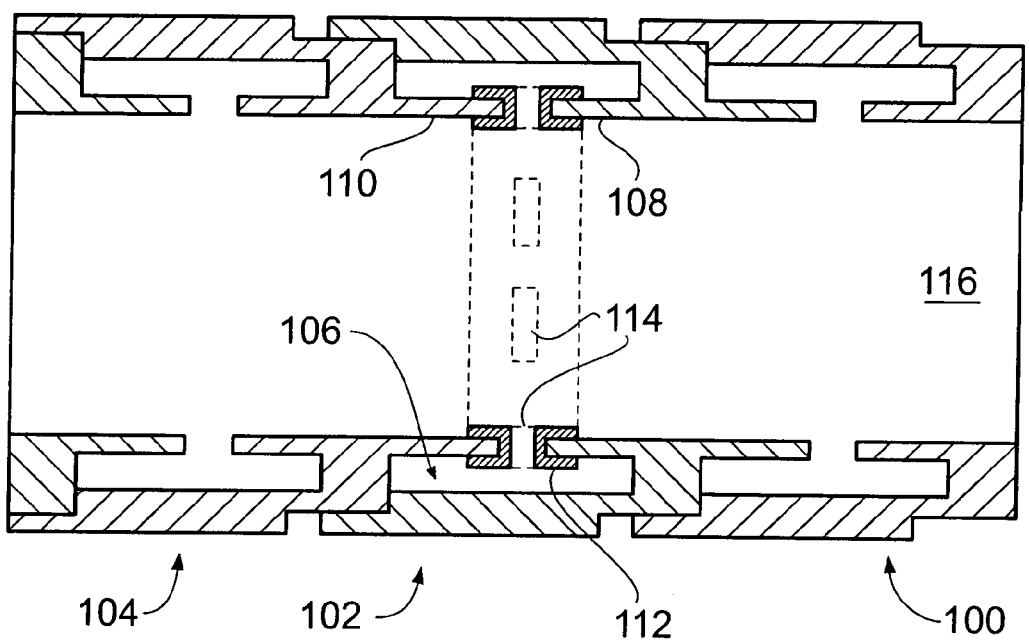
FIG. 7 shows a schematic sectional view of an alternative embodiment to FIG. 6.

FIG. 7 shows a modification of the view shown in FIG. 6. Here, the modular elements 100, 102, 104 have inner walls which overhang their side walls (apart from element 100, since this is the first in the series). To take element 102 as an example, the aperture formed in communication with chamber 106 is located about half way along the chamber 106. The aperture is defined by the gap between inner wall 108 of element 102 and inner wall 110 of element 104. FIG. 7 also shows a spacing ring 112. This differs from the spacing ring 92 described previously, since it has two mounting surfaces. Spacing ring 112 is attachable to both inner wall 108 and inner wall 110. In this way, inner wall 108 and inner wall 110 are connected. This gives the structure further mechanical integrity, particularly since the inner walls of the modular elements are usually quite thin. Connection of spacing ring 112 between the inner walls can help to prevent unwanted vibration of the inner walls, since the length of inner wall is shorter in FIG. 7 than in FIG. 6. Furthermore, spacing ring 112 helps to support both inner walls to reduce vibration. Spacing ring 112 includes slots 114 in order to provide an aperture between duct 116 and chamber 106. Variation in the slot area/number allows the dampening frequency of chamber 106 to be tuned. Again, spacing rings 112 could be provided which are colour-coded to indicate the slot area.

Figure 8:
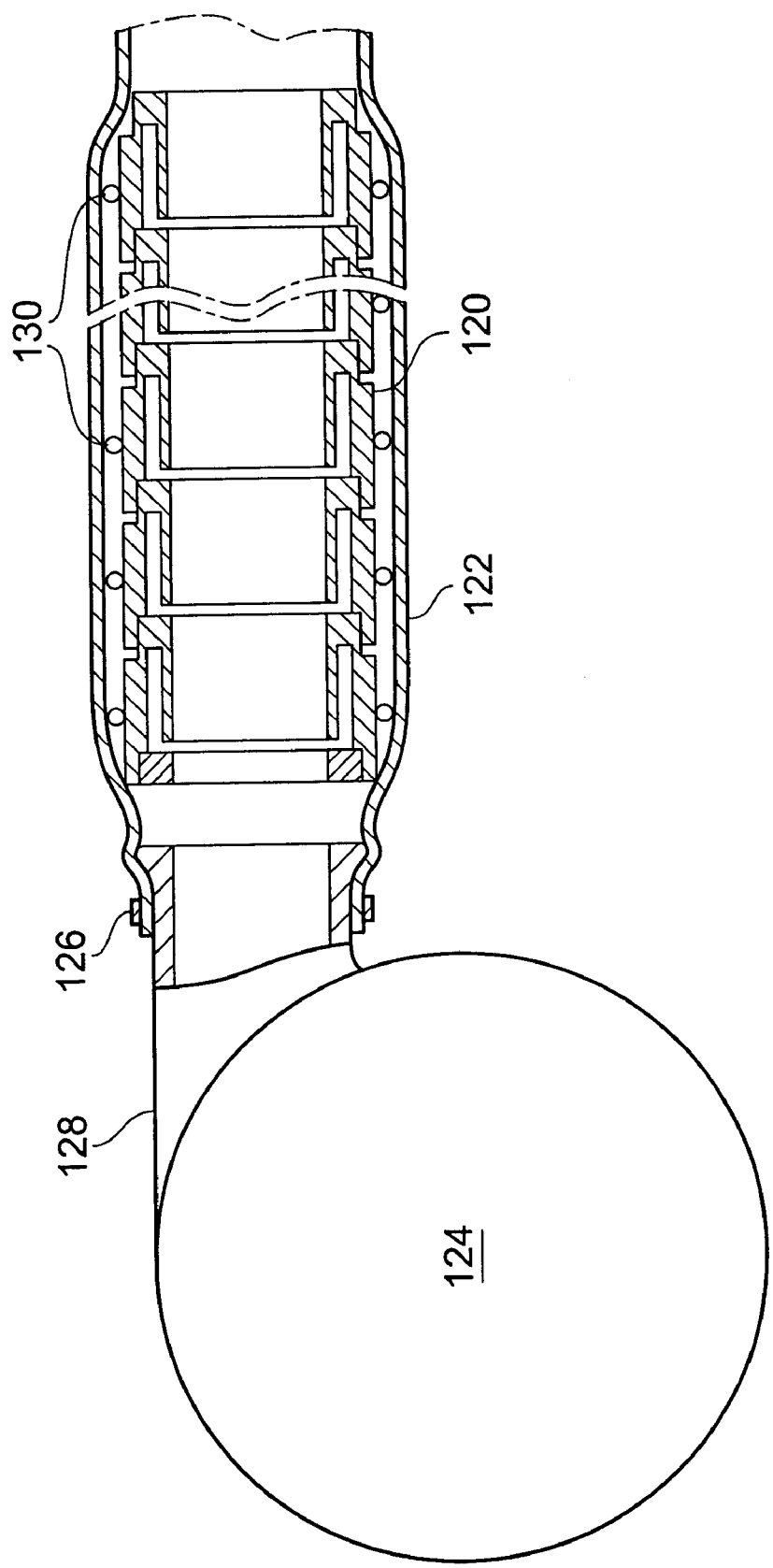
FIG. 8 shows a schematic partial sectional view of a noise suppressor and a vibrational damping hose arrangement attached to the compressor side of a turbo.

FIG. 8 shows a noise suppressor made up of a series of at least five modular elements, similar to those seen in FIG. 6 (but without any spacing ring(s) shown). The noise suppressor 120 itself is held in a hose 122. The hose is attached to the compressor side of a turbo 124 by an attachment clip 126 which is attached to the turbo outlet 128, around the hose wall. As can clearly be seen in FIG. 8, it is advantageous if the duct defined by the noise suppressor is of similar diameter to the duct at the turbo outlet 128. Furthermore, it is advantageous if the duct defined by the noise suppressor has a relatively smooth bore in order to disrupt air flow as little as possible, whilst still providing adequate noise suppression. The noise suppressor shown in FIG. 8 would be tuned to the particular ranges of noise frequency which it is desirable to suppress.

The arrangement shown in FIG. 8 has the advantage that it is the hose 122 which is attached to the turbo outlet 128, rather than the noise suppressor. Therefore the noise suppressor itself need not withstand clamping loads or be gas tight.

Noise suppressor 120 is sprung within hose 122. This is by means of a series of O-rings disposed axially around and along the noise suppressor. O-rings 130 urge the noise suppressor towards the position shown in FIG. 8, i.e. towards the axis of hose 122. However, noise suppressor 120 can move away from this position against the urging of O-rings 130.

In particular, the noise suppressor 120 can be forced to oscillate within hose 122 by mechanical vibration. This property can be harnessed in order to make the hose arrangement shown in FIG. 8 become a mechanical vibration damper. In particular, if the hose 122 and a noise suppressor 120 oscillate substantially out of phase, then their vibrations may cancel, to give substantially no vibration at a particular frequency.

The damping characteristics of the hose arrangement depend on the elasticity of the O-rings 130. Of course, the damping characteristics also depend upon the size and mass of the O-rings.

Figure 9:
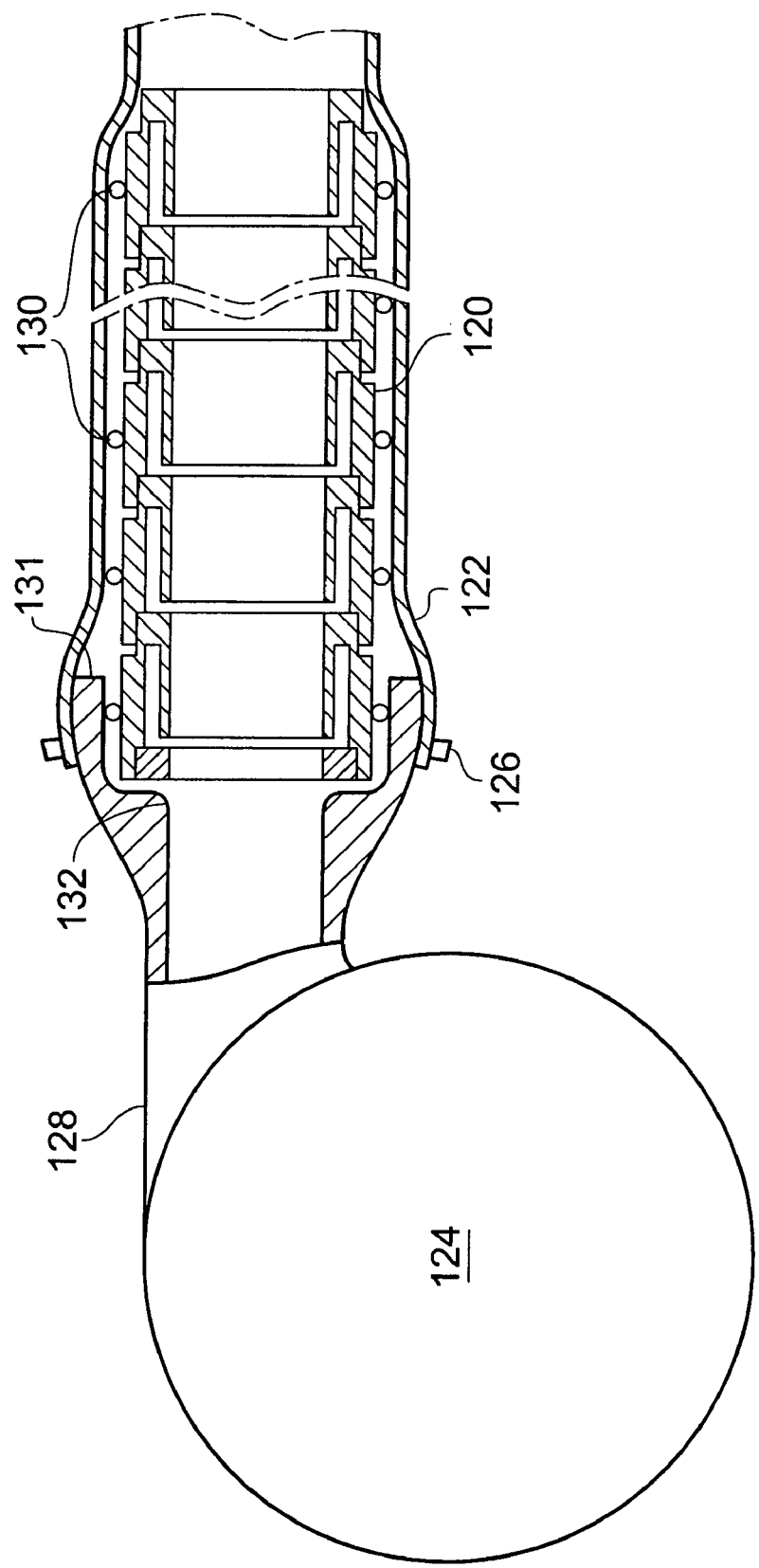
FIG. 9 shows a modification of the arrangement of FIG. 8.

In the arrangement shown in FIG. 8, the noise suppressor 120 is wholly within the hose 122. It is possible, however, for the noise suppressor 120 to be partially, or even wholly, within the turbo outlet 128. FIG. 9 shows such an arrangement in which the noise suppressor 120 is partially within the turbo outlet 128. The same reference numerals are used to indicate corresponding parts.

Thus, in the arrangement of FIG. 9, the turbo outlet 128 extends partially over the noise suppressor 120, and is sealed thereto by O-ring 131. In the arrangement of FIG. 9, the turbo outlet 128 is shaped to have a ridge 132 within it so that the interior of the noise suppressor 120 is approximately aligned with that part of the interior of the turbo outlet which leads to the noise suppressor 120. It would also be possible, of course, for the noise suppressor to be sized so as to fit within a standard turbo outlet.

Figure 10:
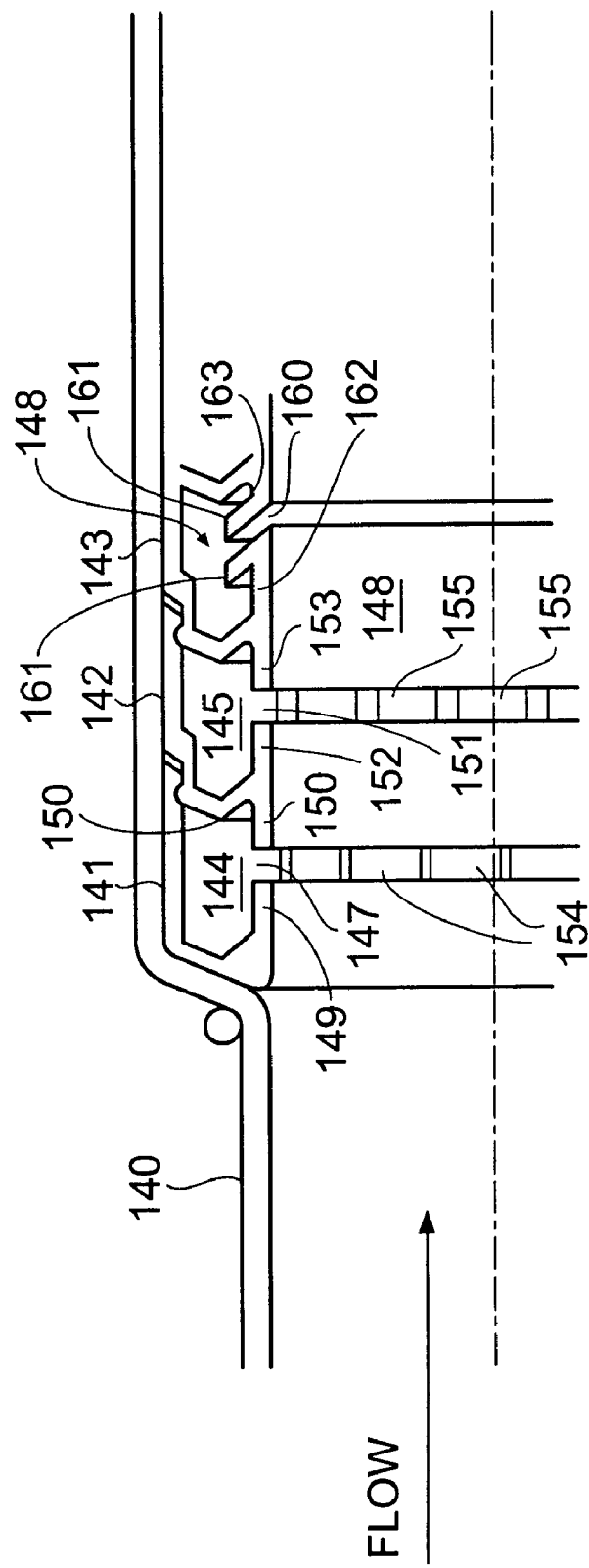
FIG. 10 shows modules of a noise suppressor, including a module with an inclined aperture.

In the embodiments of the invention described earlier, the apertures leading from the central duct of the noise suppressor to the respective chambers have been generally perpendicular to the axis of the duct. FIG. 10 illustrates an arrangement in which the aperture is not perpendicular.

In particular, FIG. 10 shows schematically a noise suppressor in a hose 140, the noise suppressor having at least three modular elements 141, 142 and 143. There may be further modular elements not shown in FIG. 10. Modular elements 141, 142, 143 interlock to define respective chambers 144, 145 and 146. The chamber 144 has an aperture 147 leading into the central duct 148 of the noise suppressor, that aperture 147 being defined between an inner wall 149 of modular element 141 and an inner wall 150 of modular element 142. Similarly, chamber 145 is connected to the duct 148 by aperture 151 defined between an inner wall 152 of modular element 142 and an inner wall 153 of modular element 143.

In the arrangement of FIG. 10, apertures 178 and 151 have the same axial width, and thus to provide different noise suppression characteristics, those apertures may be partially filled by castellations 154 on inner wall 149 and castellations 155 on inner wall 152. Thus, the apertures 147, 151 are not open around the whole of the circumference of the duct 148, but only between the castellations 154, 155 respectively. This is similar to the arrangements described with reference to e.g. FIGS. 4 and 6, but with the castellations 154, 155 being integral with the modular elements 141, 142, rather than on a separate insert.

The modular element 143 is, however, different in that its chamber 146 is connected to the duct 148 by an aperture 160 which is inclined relative to the axis of the duct. In particular, it is inclined so that it extends backwardly relative to the flow of the gas through the noise suppressor as it extends from the duct 148 to the chamber 146. The reason for this is that it reduces the effect of variations of the flow of gas passing through the duct 146 on the resonance of gas in the aperture 160, which improves the noise suppression characteristics. The inclined aperture 160 may be formed by inclined projections 161 on respective inner walls 162, 163 of the modular element 143. Alternatively, where there are more modular elements to the right of the modular element 143 in FIG. 10, the wall 163 and its corresponding projection 161 may, in fact, be formed by walls of such a modular element.

It has previously been mentioned that a fifth development of this invention is concerned with a vibration absorber, and in particular the absorption of vibration by the movement of an inner mass with respect to a hose wall. This has already been referred to in the embodiment of FIG. 8, in which the noise suppressor 122 is mounted within the hose 122 via O-rings 1–30 which permit the noise suppressor 120 to vibrate relative to the hose 122, and so it is a mechanical vibration damper. Similar arrangements were shown in FIG. 9 but with the noise suppressor extending into the turbo outlet.

However, in this development of the invention, it is not necessary that the inner mass within the hose is formed by a noise suppressor. Nor is it necessary that the springs are provided by O-rings.

Figure 11:
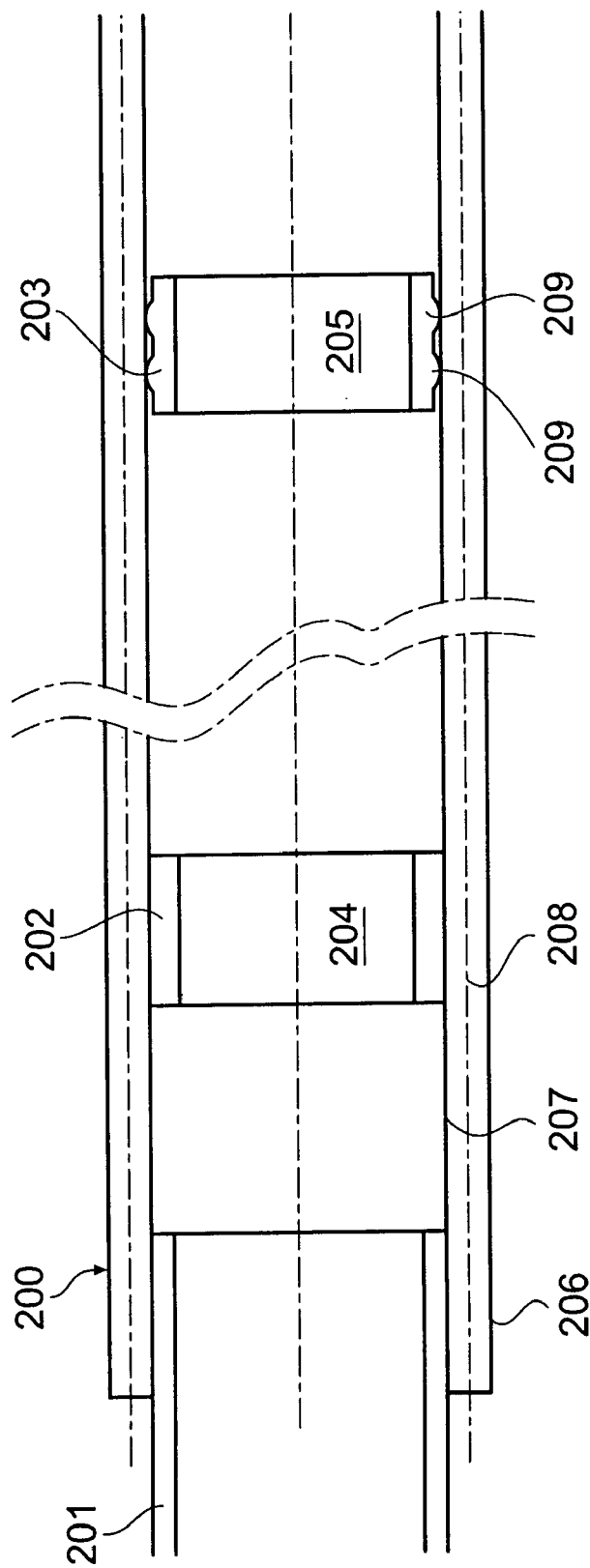
FIG. 11 shows an embodiment of a mass damper in a hose.

Further possibilities for this fifth development are thus illustrated in FIG. 11. In FIG. 11, the hose 200 extends from a turbo outlet 201 and contains masses 202, 203. Whilst it would be possible for those masses 202, 203 to be noise suppressors as in the embodiments of the present invention described earlier, they need not be and may be simple solid elements of suitable material, e.g. plastics, metal etc. as appropriate. In each case, the masses 202, 203 have hollow interiors 204, 205 so that gas can pass through them down the hose 200 from the turbo outlet 201.

In the embodiment of FIG. 11, the hose 200 has an outer wall 206 of e.g. woven material to provide sufficient strength, with an inner liner 207 of resilient material. There may be a reinforcing layer 208 between the outer wall 206 and the liner 207.

Since the liner 207 is of resilient material, the masses 202, 203 can move relative to the outer wall 206 of the hose 200 by deformation of the liner 207, thus providing a spring effect due to the resilience of the liner 207. The liner 207 thus acts in the same way as O-rings 130 in FIG. 8.

In a further development, the mass 203 has projections 209 on its outer surface, which abut against the liner 207. The shape of those projections 209 adjusts the stiffness of the liner to vibration and thus an appropriate damping effect can be achieved.

It would also be possible for the masses 202, 203 to be in the inlet or outlet of a turbo, or partially in such an inlet or outlet and partially within a hose, as in the embodiment of FIG. 9.

Embodiments of the present invention have been described by way of example only. Modifications of these embodiments, further embodiments and modifications thereof will be apparent to a person skilled in the art. As such, it is intended that these lie within the scope of the invention.

What is claimed is:

1. A noise suppressor comprising modular portions, each having an internal duct length, said modular portions being engaged in series to define a plurality of suppression chambers and an internal duct including said duct lengths, each suppression chamber communicating with the internal duct via one or more apertures, each aperture having an area and each suppression chamber thereby having an associated total aperture area, wherein one combination of one of said chambers with its associated total aperture area has different noise suppression characteristics compared to a combination of another of said chambers with its associated total aperture area, and each suppression chamber is bounded by parts of two of said modular portions, so that each chamber is separated from an adjacent chamber by a respective internal wall of the modular portions, and wherein, for each two of said modular portions, there is only one chamber, and each said chamber is undivided, wherein the suppressor has at least one insert part removably mountable in the inlet of at least one chamber partially to obstruct said inlet, the insert part being arranged to affect the noise suppression characteristics of said at least one chamber.

2. A noise suppressor having modular portions engaged in series to define a plurality of suppression chambers and an internal duct, each suppression chamber communicating with the internal duct via one or more apertures, each aperture having an area and each suppression chamber thereby having an associated total aperture area, wherein one combination of one of said chambers with its associated total aperture area has different noise suppression characteristics compared to a combination of another of said chambers with its associated total aperture area, and each suppression chamber is bounded by parts of two of said modular portions, so that each chamber is separated from an adjacent chamber by a respective internal wall of the modular portions, and wherein the suppressor includes a spacer located at a gap between inner walls of adjacent modular portions, the spacer being attachable to an end of the inner wall of one modular portion, wherein the spacer has axial projections which serve to blank off part of the gap between adjacent inner walls.

3. A noise suppressor having modular portions engaged in series to define a plurality of suppression chambers and an internal duct, each suppression chamber communicating with the internal duct via one or more apertures, each aperture having an area and each suppression chamber thereby having an associated total aperture area, wherein one combination of one of said chambers with its associated total aperture area has different noise suppression characteristics compared to a combination of another of said chambers with its associated total aperture area, and each suppression chamber is bounded by parts of two of said modular portions, so that each chamber is separated from an adjacent chamber by a respective internal wall of the modular portions, each modular portion has an inner wall, said inner wall forming a duct length of the modular portion and wherein the suppressor includes a spacer located at a gap between inner walls of adjacent modular portions, the spacer being attachable to an end of the inner wall which forms the duct length of one modular portion, wherein the spacer is attachable to opposing faces of adjacent inner walls.

4. A kit of parts including at least three modular portions, each modular portion having an inner wall, a side wall and an outer wall, wherein the inner wall, side wall and outer wall partially enclose a space, each modular portion being connectable to another in order to define a plurality of suppression chambers by further enclosing the space with the side wall of said another modular portion, to give respective suppression chambers with an aperture, further including a plurality of spacers, each spacer being attachable to an end of the inner wall of a modular portion, wherein each spacer has one or more axial blanking projections.

5. A kit of parts including at least three modular portions, each modular portion having an inner wall, a side wall and an outer wall, wherein the inner wall, side wall and outer wall partially enclose a space, each modular portion being connectable to another in order to define a plurality of suppression chambers by further enclosing the space with the side wall of said another modular portion, to give respective suppression chambers with an aperture, further including a plurality of spacers, each spacer being attachable to an end of the inner wall of a modular portion, wherein each spacer is attachable to opposable faces of adjacent inner walls.

6. A hose arrangement comprising a hose with a noise suppressor located within the hose, the noise suppressor having modular portions, each modular portion having an internal duct length, said modular portions being engaged in a series to define a plurality of suppression chambers arranged in series, and an internal duct including said internal duct lengths, each suppression chamber communicating with the internal duct via one or more apertures, each aperture having an area and each suppression chamber thereby having an associated total aperture area, wherein one combination of one of said chambers with its associated total aperture area has different noise suppression characteristics from a combination of another of said chambers with its associated total aperture area, and wherein the noise suppressor has an outer wall within said hose, said outer wall partially bounding said suppression chambers, there being a resilient member between said outer wall and said hose so that said noise suppressor has a rest position towards which said resilient member urges said noise suppressor, and said hose and said noise suppressor are movable relative to each other against the urging of said resilient member by a vibrational force, thereby to dampen the vibration.

7. A hose arrangement including a hose with a noise suppressor located within the hose, the noise suppressor having modular portions engaged in series to define a plurality of suppression chambers arranged in series, and an internal duct, each suppression chamber communicating with the internal duct via one or more apertures, each aperture having an area and each suppression chamber thereby having an associated total aperture area, wherein one combination of one of said chambers with its associated total aperture area has different noise suppression characteristics from a combination of another of said chambers with its associated total aperture area, wherein the hose arrangement includes two spaced-apart suppressors within the hose.

8. A hose arrangement according to claim 7, wherein the hose is bent in the space between the noise suppressors.

9. A noise suppressor having a plurality of suppression chambers arranged in series, an inner wall of at least one of the chambers, and an internal duct, said internal duct being formed by said inner wall of the chamber, each chamber having an inlet to the internal duct, the suppressor having at least one insert part removably mountable in the inlet to the internal duct of at least one chamber partially to obstruct said inlet, the insert part being arranged to affect the noise suppression characteristics of said at least one chamber, wherein the inlet of each suppression chamber is formed by a plurality of apertures.

10. A noise suppressor according to claim 9, wherein the insert part is shaped to obstruct entirely one or more of said apertures.

11. A noise suppressor according to claim 10, wherein the insert part is engageable with the one or more apertures which it obstructs in order to locate the insert with respect to the internal duct.

12. A noise suppressor having a plurality of suppression chambers arranged in series, an inner wall of at least one of the chambers, and an internal duct, said internal duct being formed by said inner wall of the chamber, each chamber having an inlet to the internal duct, the suppressor having at least one insert part removably mountable in the inlet to the internal duct of at least one chamber partially to obstruct said inlet, the insert part being arranged to affect the noise suppression characteristics of said at least one chamber, wherein the inlet of each suppression chamber is an annular slot extending circumferentially around the internal duct, and wherein the insert part is collarshaped and has enclosed holes or slots formed in it.

13. A noise suppressor according to claim 12, wherein the slots or holes in the insert part have a different depth to the depth of the apertures, thereby to affect the coupling efficiency of the suppression chamber.

14. A hose arrangement, including a hose wall and an inner mass arranged in the space enclosed by the hose wall, the inner mass being separated from the interior of the hose wall by a resilient member so that the inner mass has a rest position towards which the resilient member urges the inner mass, and the hose wall and the inner mass are moveable relative to each other against the urging of the resilient member by a vibrational force, thereby to dampen the vibration, wherein the inner mass is a noise suppressor, said noise suppressor having modular portions engaged in series to define a plurality of suppression chambers and an internal duct, each suppression chamber communicating with the internal duct via one or more apertures, each aperture having an area and each suppression chamber thereby having an associated total aperture area, wherein one combination of one of said chambers with its associated total aperture area has different noise suppression characteristics compared to a combination of another of said chambers with its associated total aperture area, and each suppression chamber is bounded by parts of two of said modular portions, so that each chamber is separated from an adjacent chamber by a respective internal wall of the modular portions.

15. A hose arrangement, including a hose wall and an inner mass arranged in the space enclosed by the hose wall, the inner mass being separated from the interior of the hose wall by a resilient member so that the inner mass has a rest position towards which the resilient member urges the inner mass, and the hose wall and the inner mass are moveable relative to each other against the urging of the resilient member by a vibrational force, thereby to dampen the vibration, wherein the inner mass is a noise suppressor, said noise suppressor having a plurality of suppression chambers arranged in series, and an internal duct, each chamber having an inlet to the internal duct, the suppressor having at least one insert part removably mountable in the inlet of at least one chamber partially to obstruct said inlet, the insert part being arranged to affect the noise suppression characteristics of said at least one chamber.

16. A turbocharger having an inlet and an outlet, wherein an inner mass is at least partially arranged in the space enclosed by a wall of the inlet or outlet, the inner mass being separated from the interior of the wall by a resilient member so that the inner mass has a rest position towards which the resilient member urges the inner mass, and the wall and the inner mass are movable relative to each other against the urging of the resilient member by a vibrational force, thereby to dampen the vibration, and wherein the inner mass is a noise suppressor, said noise suppressor having modular portions engaged in series to define a plurality of suppression chambers and an internal duct, each suppression chamber communicating with the internal duct via one or more apertures, each aperture having an area and each suppression chamber thereby having an associated total aperture area, wherein one combination of one of said chambers with its associated total aperture area has different noise suppression characteristics compared to a combination of another of said chambers with its associated total aperture area, and each suppression chamber is bounded by parts of two of said modular portions, so that each chamber is separated from an adjacent chamber by a respective internal wall of the modular portions.

17. A turbocharger having an inlet and an outlet, wherein an inner mass is at least partially arranged in the space enclosed by a wall of the inlet or outlet, the inner mass being separated from the interior of the wall by a resilient member so that the inner mass has a rest position towards which the resilient member urges the inner mass, and the wall and the inner mass are movable relative to each other against the urging of the resilient member by a vibrational force, thereby to dampen the vibration, and wherein the inner mass is a noise suppressor, said noise suppressor having a plurality of suppression chambers arranged in series, and an internal duct, each chamber having an inlet to the internal duct, the suppressor having at least one insert part removably mountable in the inlet of at least one chamber partially to obstruct said inlet, the insert part being arranged to affect the noise suppression characteristics of said at least one chamber.

18. A turbocharger having an inlet and an outlet, wherein an inner mass is at least partially arranged in the space enclosed by a wall of the inlet or outlet, the inner mass being separated from the interior of the wall by a resilient member so that the inner mass has a rest position towards which the resilient member urges the inner mass, and the wall and the inner mass are movable relative to each other against the urging of the resilient member by a vibrational force, thereby to dampen the vibration, and wherein the inner mass is partially arranged in the space enclosed by a wall of a hose.

* * * * *

UNITED STATES PATENT AND TRADEMARK OFFICE
CERTIFICATE OF CORRECTION

PATENT NO. : 6,983,820 B2 Page 1 of 1
APPLICATION NO. : 10/236568
DATED : January 10, 2006
INVENTOR(S) : David Boast and Donald Milne Turner It is certified that error appears in the above-identified patent and that said Letters Patent is hereby corrected as shown below:

In the Specification:

Col. 6, line 11 delete "fro" insert --from--.

Col. 7, line 56 delete "a" insert --an--.

Col. 9, line 17 delete "realised" insert --realized--.

Col. 9, line 24 delete "bring" insert --being--.

Col. 9, line 47 delete "extend" insert --extent--.

Col. 10, line 59 delete "are" insert --at--.

Col. 13, line 41 delete "where" insert --were--.

Signed and Sealed this

Third Day of October, 2006

JON W. DUDAS
*Director of the United States Patent and Trademark Office*